United States Patent [19]

Lambertus

[11] Patent Number: 4,511,320
[45] Date of Patent: Apr. 16, 1985

[54] EXTRUDER WITH A CASSETTE FILTER FOR MOLTEN PLASTIC MATERIAL

[75] Inventor: Friedrich Lambertus, Stuttgart, Fed. Rep. of Germany

[73] Assignee: Werner & Pfleiderer, Stuttgart, Fed. Rep. of Germany

[21] Appl. No.: 590,785

[22] Filed: Mar. 19, 1984

[30] Foreign Application Priority Data

Mar. 17, 1983 [DE] Fed. Rep. of Germany ....... 3309505

[51] Int. Cl.³ .......................... B29F 3/04; B01D 27/06
[52] U.S. Cl. ..................... 425/199; 210/387; 210/493.1; 425/376 R
[58] Field of Search ................. 425/197–199, 425/376 R, 378 S, 379 S; 210/399, 387, 493.1, 493.2, 493.5, 456

[56] References Cited

U.S. PATENT DOCUMENTS 3,458,978 8/1969 Davis ................................ 210/493.1
3,465,413 9/1969 Rosaen et al. ..................... 210/493.1
4,025,434 5/1977 Mlada ................................ 210/455

FOREIGN PATENT DOCUMENTS 2610816 10/1976 Fed. Rep. of Germany .
1489148 10/1977 United Kingdom .
1594700 8/1981 United Kingdom .

Primary Examiner—Willard E. Hoag
Attorney, Agent, or Firm—Roberts, Spiecens & Cohen

[57] ABSTRACT

A cassette filter for molten plastic comprising a filter screen movable transversely of the melt flow and enclosed between plates in a filter casing of an extruder. The superimposed plates are engaged in a guide passage and the inlet and outlet of the filter casing is sealed by cooling of the melt. The surface of the filter screen is clamped between a tooth-shaped surface of a plate and a cover member which interfits in the profile.

19 Claims, 5 Drawing Figures

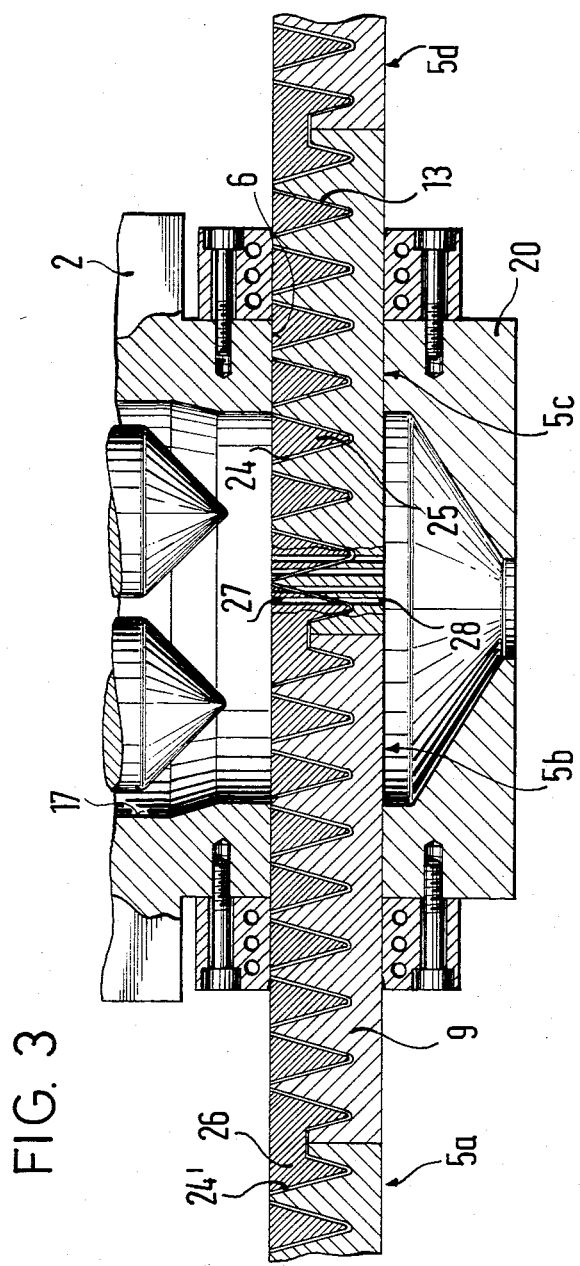

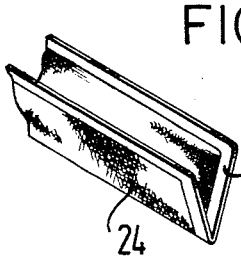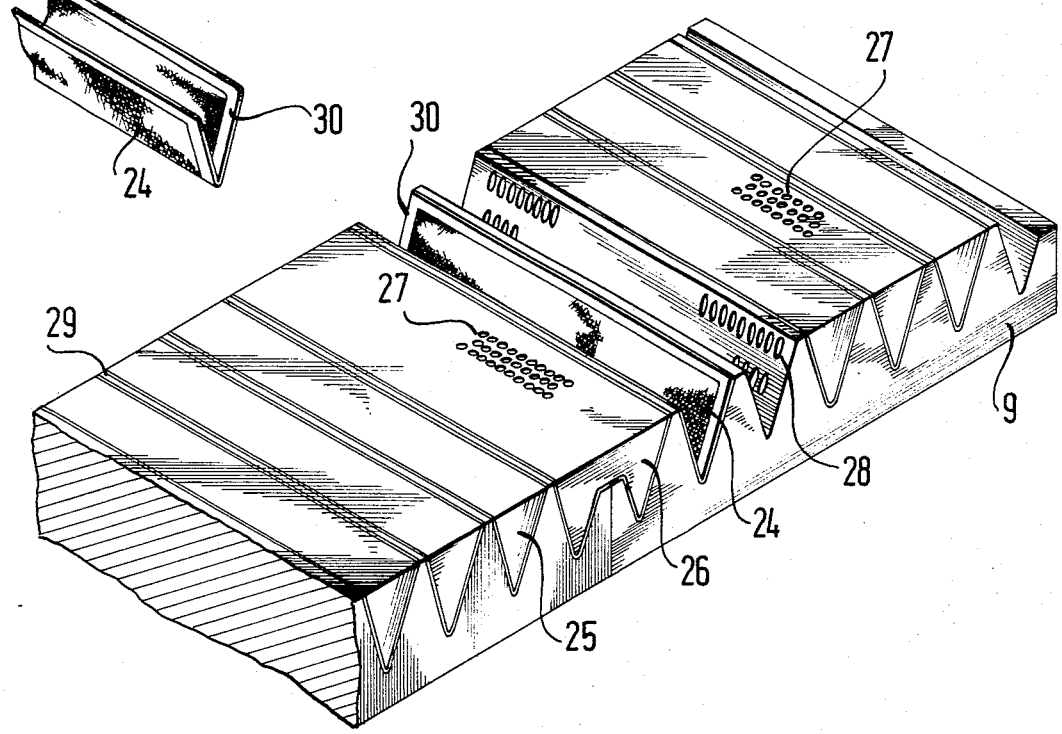

EXTRUDER WITH A CASSETTE FILTER FOR MOLTEN PLASTIC MATERIAL

FIELD OF THE INVENTION

This invention relates to a cassette filter for molten plastic adapted for use with an extruder and movable transversely to expose progressive sections of the filter to the molten plastic.

PRIOR ART

Cassette filters for molten plastic are known. They are mainly used in continuous plastic processing, such as in plate or pipe extrusion, for the purpose of removing foreign matter or residues from the polymer melt, to ensure adequate production quality. The cassette filters, while being laterally tightly sealed, are successively moved passed the extruder outlet area, so that this area receives a constantly replaced filter surface.

By continuously replacing the screen by a steady cassette filter feed, processing can be carried out under constant extrusion conditions. This primarily concerns the extrusion pressure and back pressure in the polymer melt, which influence the polymer melt temperature in the extruder and the discharge process and thus also have a significant role in the achievable quality of the extruded product.

In comparison with discontinuous filter units, which are also used in plastic preparation and are replaced according to the degree of contamination, the use of cassette filters provides a significant optimization of the method of processing. With a steady and constantly penetrable screen, constant extruder output rates can be achieved.

The continuous movement of the filter, laterally of the direction of the melt from the extruder, requires special design considerations for the guide passage of the filter, the sealing of the filter guide surface, and the coupling of the elements of the cassette filter. In consideration of the maximum back pressure at the extruder for constant temperature conditions, the filter or screen surface is measured by the cross-section of the extruder outlet, while the filter guide surfaces must be so dimensioned that a permissible contact pressure is not exceeded.

This has the disadvantage that large dimensions are required for the cassette filters and their casing, particularly when they are used for large throughputs, as is now required for the preparation of plastics.

This not only involves high construction costs to overcome the contact forces for the filter feed, but also considerable power consumption for heating the filter unit, while the heat loss increases more than proportionally with the size of the filter unit. Furthermore, in view of the necessity of cleaning the filter cassettes in special cleaning baths and the economic application of the known continuously operated filters, the practical application of filters thus has technological limitations.

This is also the reason why such filter systems have so far had no economic significance in connection with extruded plastics.

It is an object of this invention to overcome these disadvantages and to make use of the advantages offered by the cassette filter for the preparation of plastics.

A cassette filter is disclosed in German Published Application DE-OS No. 2 610 816, where the filter, which consists of a screen cloth, is enclosed in flat condition between perforated and superimposed plates and, together with these plates, is movable transversely with respect to the polymer flow of the extruder, while the plates interlock with toothed projections and recesses bounding the filter, which are situated opposite one another at the plate edges. The superimposed plates are mechanically connected by a stepped overlap at the plate ends.

With this filter device, the effective screen surface used for the filtering process is limited to the screen surface which is mounted flat in front of the extruder orifice. Compared to the overall filter cassette surface, the dimensions of the screen are limited by the dimensions of the projections and recesses that are arranged longitudinally of the clamping plates, so that only a relatively small portion of the effective screen surface can be used. Conversely, the clamping plates and, therefore, the filter casing must be suitably dimensioned, so that the desired throughput can be achieved with the screen. The costs involved in the construction of such a device are, as mentioned above, unacceptable; these are ascribed to the handling of the clamping plates and power consumption, particularly in connection with high throughputs which require preparation of the plastic in the extruder. A melt throughput of $\pm 8$ t/h will require a filter surface of about 900 cm$^2$, while the filter device has a total weight of almost 7 t, and the required wattage measures 140 kW.

SUMMARY OF THE INVENTION

This invention is based on the conception of a filter device in the form of a cassette for plastic melt for extruders, which enables high throughput rates without modifying the processing conditions, i.e. extrusion pressure and temperature, and, while being smaller in size, and easier handling during cleaning.

The invention contemplates a cassette filter which comprises a plurality of successive elements each having a tooth-shaped profile with respective flanks covered by a filter material and means fitted in the tooth-shaped profiles for sandwiching the filter means between the tooth-shaped profiles of the elements and the means which is fitted into the tooth-shaped profiles. The successive elements inclusive of the means which is fitted into the tooth-shaped profiles have aligned bores for passage of melt therethrough and through the filter material.

In a particular embodiment, each filter element comprises a pair of tooth-shaped clamping plates which sandwich the filter material between the tooth-shaped surfaces.

The tooth-shaped surfaces of the clamping plates cause the filter material, which is in the form of a cloth to assume the tooth-shaped profile. The resulting filter has, as compared to the cross-section of the melt channel, a particularly large filter surface. This enhances the flow rate of the melt through the filter, without affecting the extrusion pressure and the back pressure of the melt, which builds up in the extruder.

However, for a low throughput, the feed rate of the cassette filter can be so reduced that the filter life can be extended considerably, until it becomes necessary to clean the filter for further use. Due to the special design of the filter and the arrangement of the matching clamping plates, the effective surface of the filter exceeds by many times that found in conventional designs, and enables the full use of the entire cassette surface, which runs transversely to the melt flow, within the overall cross-sectional area of the melt channel in the filter casing.

The filter cassettes can, notwithstanding their enormous effective surface, be produced in an easy-to-handle size. This is significant, because the cassettes, which are to be cleaned, have to be moved to cleaning baths located some distance away from the production plants, and to which they have to be returned.

According to a further feature of this invention, the abutting surfaces of the clamping plates are staggered in the direction of transport of the cassette filter and consequently, leakage in the direction of flow of the melt, which normally occurs between the superimposed clamping plates, will be prevented, and uniform flow conditions will be achieved across the entire surface of cassette filter.

According to another feature the inlet and outlet in the filter casing for the cassette filter is provided with cooling flanges whereby uniform flow conditions will effectively be achieved in the region of the inlet and outlet filter casing, without affecting the guide passage in the filter casing and the guide plate attached thereto.

According to a further feature of the invention, a space-saving and easy-to-handle design of the filter cassettes is developed by making the filter in the form of individual strainer elements placed in each tooth-shaped hollow and held in place by a filler element whose outer surface is flush with the crests of the tooth-shaped profile. The individual strainer elements which are held in place by the fillers (also serving as effective couplings between successive elements of the cassette to achieve positive interlocking) provide an unrestricted effective filter surface extending over the entire throughput area of the filter casing, whereby equal flow conditions for the entire flow throughput is achieved along the effective overall surface.

Additionally, the effective differential pressure of the melt is used to achieve contact pressure for tightly engaging the fillers for enclosing the strainer elements by pressing against packing strips at the boundary edge of the strainer elements.

BRIEF DESCRIPTION OF THE FIGURES OF THE DRAWING

FIG. 3 is a longitudinal section showing interconnected filter cassettes according to a different embodiment of the filter screen.

FIG. 4 is a perspective view of a portion of the successive filter cassettes in FIG. 3, with a portion removed to show an inserted filter screen or strainer.

FIG. 5 is a perspective view showing a detail of the strainer in FIG. 4.

DETAILED DESCRIPTION

Figure 1:
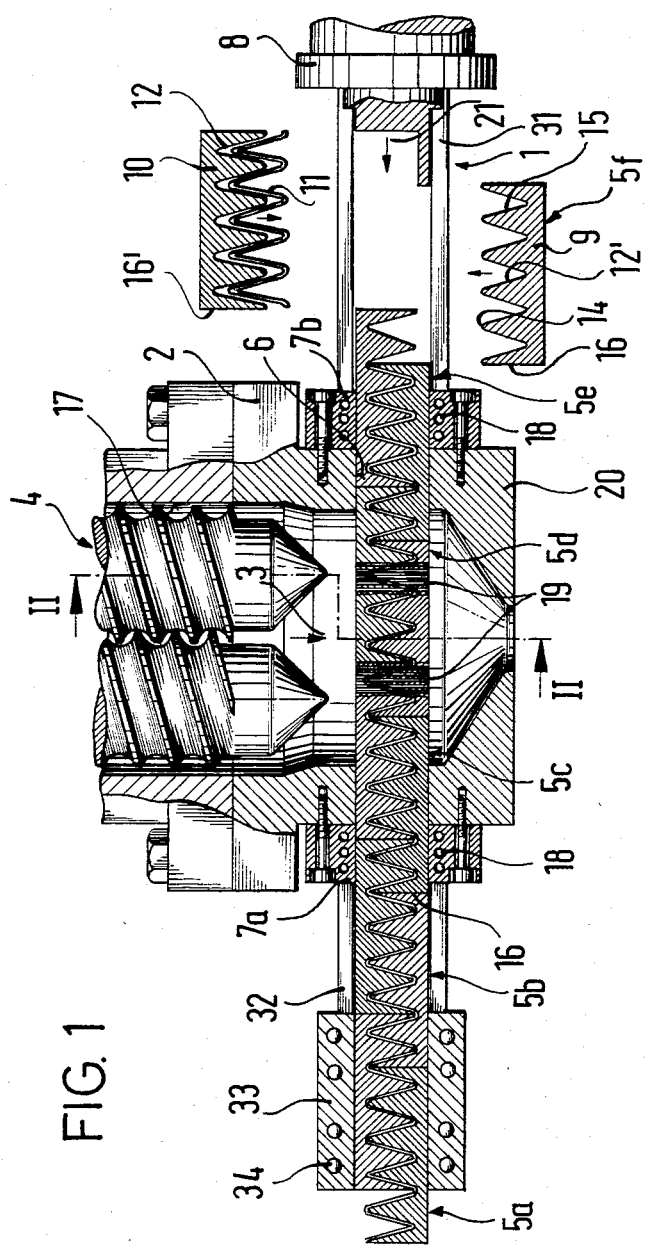
FIG. 1 is a longitudinal section, partly broken away, of a cassette filter device according to the invention located at an extruder outlet and melt channel.

In FIG. 1 is seen a cassette filter device 1 arranged in a filter casing 2 transversely to the direction of flow 3 of molten plastic from a casing bore 17 of an extruder 4. The cross-section of the casing bore 17 extends over the full width of the cassette filter surface, as shown in FIG. 2.

The cassette filter device 1 is formed by a plurality of closely adjoining filter cassettes 5a–5f, which are inserted into a rectangular passage 6 formed by the filter casing 2 and a guide plate 20. The filter cassettes are advanced in the direction indicated by the arrow 21, at a steady and controlled feed rate by means of a non-positive connection with a hydraulic piston and cylinder unit 8. Thereby the filter cassettes are progressively exposed to the molten plastic. The piston stroke is at least equal to about one cassette length. The piston is controlled in relation to the melt throughput which passes through the filter cassettes 5a–5b by measuring the melt back pressure build-up in front of the filter cassettes and comparing this value with a given reference value. When there is a large increase of the degree of contamination of the filter cassettes 5a–5b, the filter cassette feed is increased via a control valve (not shown), which is connected to the piston and cylinder unit 8.

The inlet and outlet side of the filter casing 2 is provided with flanges 7a, 7b, which are provided with cooling channels 18 for circulating a cooling medium whereby melt adhering to the surface of the filter cassettes 5a–5f is hardened, to form a sealing plug in this region. This sealing plug exists outside the filter casing 2 and inside the flanges 7a, 7b, which can be detachably bolted to the casing, thus ensuring a sealed and safe guidance of the filter cassettes 5a–5b.

Figure 2:
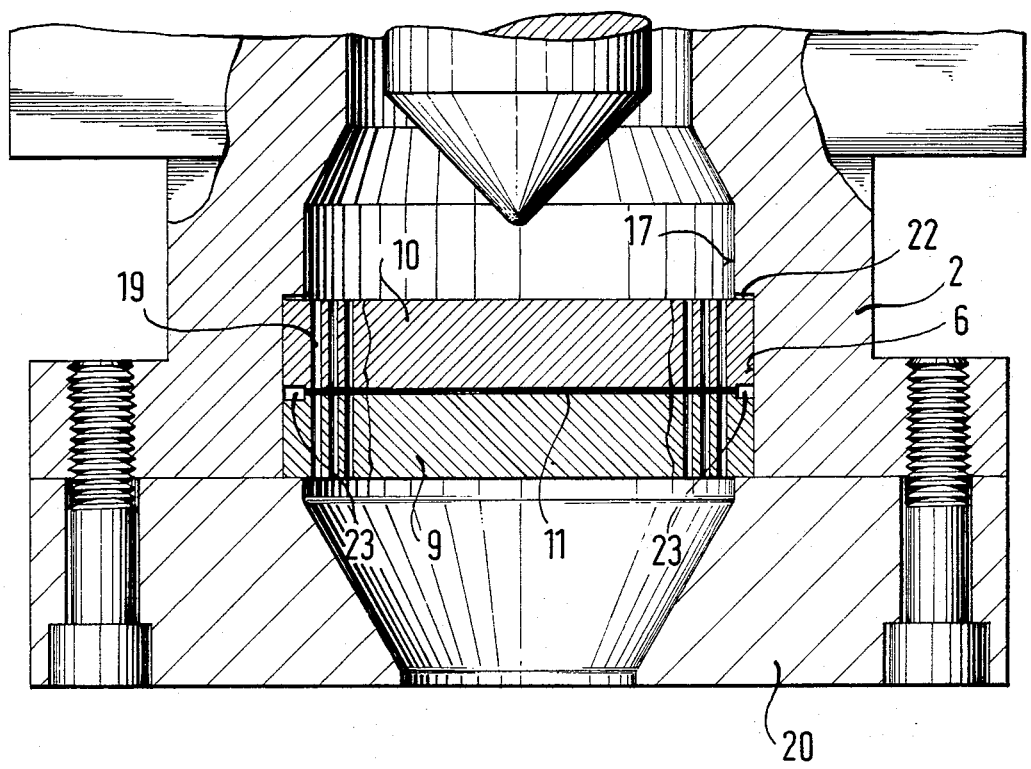
FIG. 2 is a sectional view taken on line II—II in FIG. 1 on enlarged scale.

As is further illustrated in FIGS. 1 and 2, each filter cassette 5a, 5b comprises a lower clamping plate 9 and an upper clamping plate 10 which serves as a filler. The plates 9 and 10 have bores 19 extending over the entire length and width of these plates to enable flow of the melt therethrough when the clamping plates 9, 10 are interlocked. A screen 11, which is enclosed between the clamping plates 9, 10 and extends over their entire length and width serves as a large filter medium. As seen in FIG. 1, the surfaces of the clamping plates 9, 10, which enclose the screen 11, has a tooth-shaped profile 12, 12' of wedge-shaped cross-section.

The tooth-shaped profile is formed with crests 14 and flanks 15 and the teeth extend perpendicularly to the direction of movement of the screen 11 and parallel to the abutment surfaces 16, 16' of the respective clamping plates 9 and 10. The flanks 15 serve as bearing surfaces for the preformed screen 11, which thus receives its final and usuable shape. In combination with the design of the screen edges, this shape enables a large melt throughput, while using a relatively small and cost effective cassette filter device.

The screen 11 essentially consists of several rectangular cloth layers. The edges of these cloth layers are plasma welded and rolled, and they form a narrow packing seal 23 surrounding the entire screen edge, which, due to the differential pressure of the melt acting on the upper changing plate 10, is fitted tightly between the two clamping plates 9, 10. The cassette filters are guided in shallow grooves 22, which have substantially the same dimensions as the packing seal 23, and form a passage which encompasses the edges of the clamping plates 9, 10 over their entire width. The cassette filters rest on and are supported by the guide plate 20.

By staggering the upper and lower clamping plates 9, 10 over several teeth, a positive connection of the filter cassettes takes place while enclosing the screen 11. This also prevents the formation of a continuous slit in the cross-sectional area of the filter cassettes and, at the same time, produces constant flow conditions over the entire length of the cassettes. This, however, requires that the spacing of the bores 19 be uniform over the profile length so that the bores 19 of the cassettes are in line for all staggered breaker plate arrangements.

The cassette filter device shown in FIGS. 3, 4 and 5 comprises filter cassettes 5a–5d of which filter cassettes 5b and 5c, as illustrated in FIG. 3, are active in the throughput area of the bore 17. In this embodiment, the filter cassettes 5a–5d are formed by a lower clamping plate 9 whose surface facing the melt flow has a tooth-shaped profile 13 with a wedge-shaped cross-section. Both the root and flanks are lined with a filter or strainer 24 consisting of a multi-layer rectangular cloth. In this arrangement, each individual strainer 24 is held in place by a filler 25. Several strainers 24 and fillers 25 are thus allocated to each filter cassette, so that within the bore 6 formed by the casing 2 and the guide plate 20, the filter cassettes 5a–5d define a rectangular cross-section. A positive connection of the filter cassettes 5a–5d is effected by couplings 26, which are of the shape of the toothed profile of the clamping plate 9, i.e. in the form of at least two fillers covered by crests, and which incorporate a suitably shaped strainer 24' between the coupling 26 and the teeth of the clamping plate. All of the fillers 25, couplings 26 and the filter cassettes 5a–5d have bores 27, which are aligned with corresponding bores 28 in the clamping plate 9.

The fitting of a strainer 24 into the tooth-shaped profile of the breaker plate 9 is shown in detail in FIGS. 4 and 5. FIG. 4 also shows the filler 25 and couplings 26 which fit into the respective strainers 24 and which, together with the crests 29 of the clamping plate 9, form a flat guide surface.

A packing strip 30, surrounding the strainer 24, prevents lateral leakage of melt. The packing strip 30, as illustrated in the screen according to FIG. 1, is formed by plasma welding the edges of the screen cloth and subsequent calendering. The differential pressure of the melt, which is applied to the upper surface of the cassette filter device, produces a tight fit of the packing strip 30 between the clamping plate 9 and the fillers 25 and couplings 26.

At the loading station of the cassette filter device as shown in FIG. 1, there is a guide rail 31 for inserting the filter cassettes, which is connected to the filter casing 2 and the guide plate 20.

At the unloading station there is a controllable heating device 33 with heating elements 34, for the purpose of separating the filter cassettes, which may have become adhered together by the solidified plastic, so that they can be transported to a cleaning bath. In spite of their large surface, the filter cassettes can easily be handled for cleaning, as they are relatively low in weight. This is due to the special design of the filter surface, which extends over a length several times the effective throughput cross-section of the melt and which, without affecting the flow characteristics, enables a positive connection of the individual filter cassettes.

What is claimed is:

1. A cassette filter for melt discharged from an extruder, said filter comprising a plurality of successive elements each having a tooth-shaped profile with respective flanks, filter means covering the flanks of the tooth-shaped profile and means fitted in the tooth-shaped profiles of said elements for sandwiching said filter means between the tooth-shaped profiles of said elements and the means which is fitted into the tooth-shaped profiles, said successive elements inclusive of said means which is fitted into said tooth-shaped profiles having aligned bores for passage of melt therethrough and through said filter means.

2. A cassette filter as claimed in claim 1 wherein said tooth-shaped profile is of wedge shape.

3. A cassette filter as claimed in claim 1 wherein said successive elements are interlocked by said means which is fitted into the tooth-shaped profiles.

4. A cassette filter as claimed in claim 1 wherein said means which is fitted into the tooth-shaped profiles comprises a plurality of second successive elements identical to the first said successive elements.

5. A cassette filter as claimed in claim 4 wherein the first and second successive elements are interfitted in one another in offset relation.

6. A cassette filter as claimed in claim 1 wherein said means which is fitted into the tooth-shaped profiles comprises a plurality of filter elements fitted into the tooth-shaped profiles.

7. A cassette filter as claimed in claim 6 wherein said successive elements have opposed surfaces, one of said filter elements being located at the opposed surfaces of the successive elements and filling the endmost tooth-shaped profiles of said successive elements to couple the same together.

8. A cassette filter as claimed in claim 1 wherein said successive elements define a common first flat surface remote from the tooth-shaped profile and said means which is fitted in the tooth-shaped profile defines a second flat surface.

9. A cassette filter as claimed in claim 8 wherein said first and second surfaces are parallel to one another.

10. A cassette filter as claimed in claim 8 wherein said tooth-shaped profiles define crests, said means which is inserted into the tooth-shaped profiles cooperatively forming said second flat surface in combination with said crests.

11. A cassette filter as claimed in claim 8 wherein said filter means has a boundary edge of solid material which is clamped between said successive elements and the means which is fitted in the tooth-shaped profiles.

12. Apparatus comprising an extruder outlet for plastic melt, a filter casing on said extruder outlet, a guide plate on said filter casing for flow of melt from the extruder outlet, said guide plate and filter casing defining a passage extending transversely of the direction of flow of the melt, filter means supported in said passage for filtering the melt in its flow from the extruder outlet to the guide plate, means for displacing the filter means transversely of the melt to expose progressive sections of the filter means to the melt, said filter means being perforated for flow of melt therethrough and including an internal surface of tooth-shaped profile through which the melt passes, and a filter material on said internal tooth-shaped profile for filtering the melt passing therethrough.

13. A cassette filter as claimed in claim 12 wherein said passage is of rectangular cross-section and said filter means has a rectangular outline which is slidably received in said passage.

14. A cassette filter as claimed in claim 12 wherein said passage has an inlet for entry of the filter means and an outlet for exit of the filter means, said apparatus further comprising sealing means at said inlet and outlet including cooling flanges detachably secured to the extruder outlet and guide plate for cooling the filter means.

15. Apparatus as claimed in claim 12 wherein said tooth-shape profile has roots and crests which extend perpendicularly to the direction of flow of the melt.

16. A cassette filter as claimed in claim 15 wherein said tooth-shaped profile has flanks joining said roots and crests, said filter material covering said flanks.

17. A cassette filter as claimed in claim 12 wherein said filter means comprises a succession of filter elements each having a respective tooth-shaped profile, each filter element comprising members abutting along said tooth-shaped profile with said filter material sandwiched therebetween.

18. A cassette filter as claimed in claim 17 wherein said members interlock successive filter elements.

19. A cassette filter as claimed in claim 17 wherein said filter material has a bounding edge of solid material which is clamped between said members.

* * * * *